(12) United States Patent
Caley

(10) Patent No.: US 8,166,953 B2
(45) Date of Patent: May 1, 2012

(54) FUEL INJECTION APPARATUS

(75) Inventor: David J. Caley, City Beach (AU)

(73) Assignee: Orbital Australia Pty Limited, Balcatta (AU)

( * ) Notice: Subject to any disclaimer, the term of this patent is extended or adjusted under 35 U.S.C. 154(b) by 473 days.

(21) Appl. No.: 12/278,308

(22) PCT Filed: Feb. 6, 2007

(86) PCT No.: PCT/AU2007/000115

§ 371 (c)(1),
(2), (4) Date: Dec. 10, 2008

(87) PCT Pub. No.: WO2007/090228

PCT Pub. Date: Aug. 16, 2007

(65) Prior Publication Data

US 2010/0043758 A1 Feb. 25, 2010

(30) Foreign Application Priority Data

Feb. 6, 2006 (AU) ................................. 2006900543

(51) Int. Cl.
*F02M 51/00* (2006.01)
*F01L 3/10* (2006.01)
*F02D 41/30* (2006.01)
(52) U.S. Cl. ......................... 123/490; 251/337; 701/103
(58) Field of Classification Search ................ 123/445, 123/470, 472, 476, 478, 467, 480, 490, 497; 239/585.1, 585.2, 585.5; 251/129.15, 337; 701/103, 104
See application file for complete search history.

(56) References Cited

U.S. PATENT DOCUMENTS

| 3,942,485 | A | | 3/1976 | Suda et al. |
| 4,159,623 | A | * | 7/1979 | McReynolds ................ 60/39.15 |
| 4,934,329 | A | | 6/1990 | Lear et al. |
| 5,086,980 | A | * | 2/1992 | Hickey ....................... 239/585.3 |
| 5,328,100 | A | | 7/1994 | Bergstrom et al. |
| 5,865,371 | A | | 2/1999 | Pace et al. |
| 6,167,869 | B1 | * | 1/2001 | Martin et al. ................. 123/458 |

(Continued)

FOREIGN PATENT DOCUMENTS

JP 2003-003929 1/2003

(Continued)

OTHER PUBLICATIONS

International Search Report for PCT/AU2007/000115, mailed Apr. 5, 2007.

(Continued)

*Primary Examiner* — John T. Kwon
*Assistant Examiner* — Johnny Hoang

(57) ABSTRACT

Fuel injection apparatus comprising a solenoid coil (40); an armature (41) coupled with a valve element (34) operable to open and close a fuel valve (32) when the solenoid coil (40) is selectively energized and de-energised. The valve element (34) is biased to the closed position by a biasing device (42). Magnetic force from the energized solenoid coil moves the armature (41) and valve element (34) to open the valve to an opening position to deliver fuel reached when a controller (170) calculates opening forces balance closing forces. Such opening position control is used to control fuel flow rate to a gas fuelled engine (20) and/or reduce noise vibration harshness in varied engine types. Balance of forces control, on closing of the valve, reduces or avoids impact of the valve element (34) with a physical stop (106), thus reducing engine noise, and can be used in fuel metering.

38 Claims, 12 Drawing Sheets

U.S. PATENT DOCUMENTS

| | | | | |
|---|---|---|---|---|
| 6,298,826 B1 * | 10/2001 | Cotton, III | | 123/446 |
| 6,386,467 B1 * | 5/2002 | Takeda | | 239/585.5 |
| 6,510,841 B1 * | 1/2003 | Stier | | 123/472 |
| 6,550,699 B2 * | 4/2003 | Nagai et al. | | 239/585.1 |
| 6,619,269 B1 * | 9/2003 | Stier et al. | | 123/490 |
| 6,766,788 B2 * | 7/2004 | Xu | | 123/490 |
| 6,811,138 B2 * | 11/2004 | Kuehne et al. | | 251/129.19 |
| 6,902,124 B2 * | 6/2005 | Arndt et al. | | 239/533.2 |
| 6,951,204 B2 * | 10/2005 | Shafer et al. | | 123/445 |
| 6,978,760 B2 * | 12/2005 | Stewart et al. | | 123/299 |
| 7,059,301 B2 * | 6/2006 | Stockner et al. | | 123/446 |
| 7,198,203 B2 * | 4/2007 | Brenk et al. | | 239/96 |
| 7,201,136 B2 * | 4/2007 | McKay et al. | | 123/297 |
| 2001/0029400 A1 | 10/2001 | Deffenbaugh et al. | | |

FOREIGN PATENT DOCUMENTS

| | | |
|---|---|---|
| JP | 2003-269289 | 9/2003 |
| JP | 2005-533969 | 11/2005 |
| JP | 2011-200917 | 10/2011 |
| WO | WO 98/26168 A1 | 6/1998 |
| WO | WO 02/095212 A1 | 11/2002 |
| WO | WO 2006/079172 A1 | 8/2006 |
| WO | WO 2006/079173 A1 | 8/2006 |

OTHER PUBLICATIONS

English Translation of Office Action for Japanese Patent Application No. 2008-553577, mailed Oct. 28, 2011.

* cited by examiner

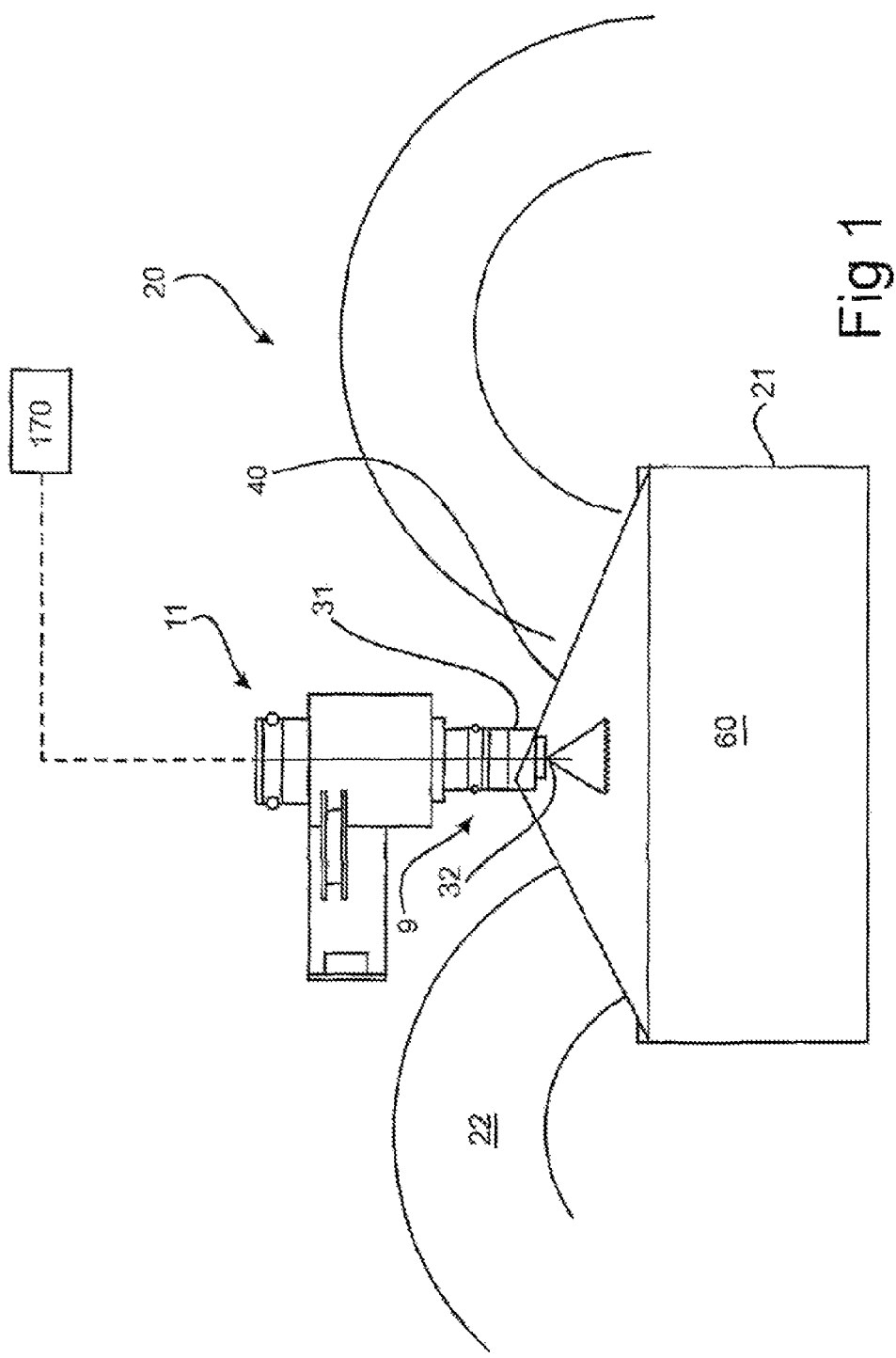

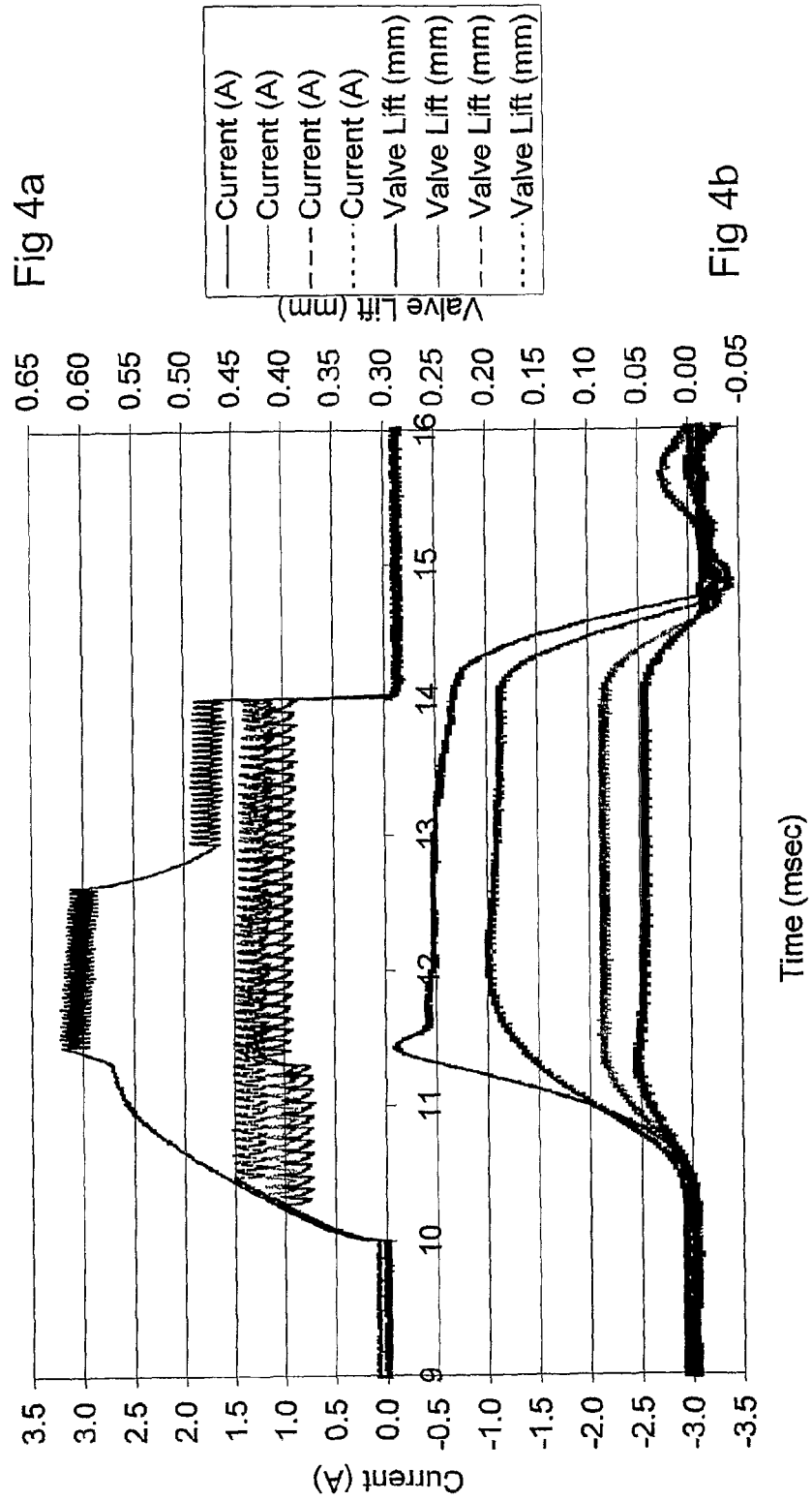

FUEL INJECTION APPARATUS

CROSS-REFERENCE TO RELATED APPLICATIONS

This application is the U.S. national phase application of International Application No. PCT/AU2007/000115, filed Feb. 6, 2007, entitled "Fuel Injection Apparatus," which claims the benefit of priority from Australian Application Serial No. 2006900543, filed Feb. 6, 2006.

This invention relates to solenoid operated fuel injection apparatus.

Fuel injection apparatus to inject fuel to a combustion chamber of an engine are well known. Equally well known are solenoid actuated fuel injection apparatus.

For example, the Applicant's U.S. Pat. No. 4,934,329 discloses a fuel injection apparatus comprising a body with a port in the body providing communication with a combustion chamber of an engine in accordance with the operation of a solenoid actuated valve element connected to a stem extending through a port cavity in the body. Electromagnetic means within the body are disposed about, and operably connected to, the valve stem. Accordingly, when the electromagnetic means is selectively energized and de-energised, the valve element may be moved to open and close the port. In that case, the electromagnetic means operates only the valve element which opens and closes the port. Delivery of fuel to the port cavity occurs in accordance with the control of a fuel metering unit. Typically, the fuel metering unit would include a separate solenoid actuated fuel metering valve.

The solenoid of U.S. Pat. No. 4,934,329 has a coil disposed concentric to the valve stem with a co-axial armature attached to the valve stem. The armature has a limited axial movement and is urged by a spring to a particular position, typically a closed position. Energising of the solenoid coil draws the armature to displace the valve stem and open the port to deliver fuel to the combustion chamber of the engine.

Such solenoids are subject to the problem of "hard landing". That is, during the cyclic movement of the valve to an open position, high frequency impact occurs with several disadvantages. First, noise-vibration-harshness (NVH) characteristics are poor. That is, noise is high. Fatigue stresses may also be increased. This remains a problem with solenoid injectors to the present date.

It is an object of the present invention to provide an injector less susceptible to the problems of "hard landing".

It is a further, or alternative, object of the present invention to provide an injector wherein the stroke of the injector may be varied.

With this object in view, the present invention provides a fuel injection apparatus comprising a solenoid coil; an armature coupled with a valve element operable to open and close a fuel valve when the solenoid coil is selectively energized and de-energized with current, the valve element being biased to the closed position by a biasing means; and a control means wherein the control means energises the solenoid coil to cause a magnetic force to move the armature and valve element to open the valve to an opening position to deliver fuel, the opening position being reached when the control means calculates that the difference between the forces urging opening of the valve and the forces urging closure of the valve is at a pre-determined value.

The fuel injection apparatus allows the open position to be reached with reduced, or without, impact of the armature with a physical stop. For example, in some operating modes, it may be desirable to allow the valve to reach the end-stop, but to do so at a reduced force and therefore at a reduced NVH level. In such a case of a controlled impact the opening forces would be greater than the closing forces, but the difference between these would be controlled by the control means to be at a minimum to achieve the desired result (in the limit this force could be set at zero, but for practical purposes and allowing for tolerances in manufacturing etc, a small net positive force would be desirable). In absence of the invention, there would be no control over the force of impact on the end-stop and thus NVH would not be reduced, Preferably the opening position of the valve is reached when the control means calculates that the forces urging opening of the valve balance with forces urging closure of the valve.

Preferably, in use, the opening position of the valve is varied in accordance with the fuel flow requirements of the injector. The stroke of the injector therefore becomes a controlled parameter and can thus be used to control the flow rate of fuel through the injector to meet different operating requirements of an engine to which the injector may be applied.

In another related aspect, the present invention provides a method of operating a fuel injection apparatus comprising a solenoid coil; an armature coupled with a valve element operable to open and close a fuel valve when the solenoid coil is selectively energized and de-energised with current, the valve element being biased to the closed position by a biasing means; and a control means, the method comprising energizing of the solenoid coil, by the control means, to cause a magnetic force to move the armature and valve element to open the valve to an opening position wherein the opening position is reached when the control means calculates that the difference between the forces urging opening of the valve and the forces urging closure of the valve are at a pre-determined value.

Preferably the opening position of the valve is reached when the control means calculates that the forces urging opening of the valve balance with forces urging closure of the valve.

Preferably, in use, where the fuel valve forms part of an injector, the opening position of the valve is varied in accordance with the fuel flow requirements of the injector. The stroke of the injector therefore becomes a controlled parameter and can thus be used to control the flow rate of fuel through the injector to meet different operating requirements of an engine to which the injector may be applied.

The most significant force urging opening of the valve is the magnetic or solenoid force. Fuel pressure may also create a force urging opening of the valve.

The forces urging closure of the valve and balanced with the forces urging opening the valve include any biasing force imposed by the biasing means as well as any other forces urging closure. Such forces may include variable forces induced by cylinder gas pressures where the fuel injection apparatus delivers fuel to an engine, noting that such cylinder gas pressures may vary significantly during engine operation. Frictional forces may also be included. The areas of the valve acted on by the opening and closing forces may differ. That is, forces urging opening of the valve predominantly act on internal surfaces of the valve whereas forces urging closure of the valve predominantly act on external surfaces of the valve. The control means may calculate, or otherwise account for, the forces accordingly. The control means can take into account that forces may change, that is, they may be dynamic. The biasing means most usually to be employed is a spring, most conveniently a coil spring. Alternatively, the spring may be a disc spring. Plural springs may be used. The spring may have a constant rate or stiffness characteristic. Preferably, however, the spring may have a variable rate or stiffness characteristic so that the closing force increases as the valve opens. The stiffness may be varied to accommodate the application and the nature of the forces to be balanced. The spring rate may, advantageously, be selected at a higher rate or value than the solenoid force so that the valve opens to a position where the solenoid force and the closing force balance with lesser displacement.

The armature has a limited axial movement or stroke, the length of which may be varied in accordance with the present invention. That is, the control means may control magnetic force by control over current supplied to the solenoid coil. Spring and other forces are either known for a given fuel injection apparatus or may be calculated. Hence, control over the point in the stroke of the armature at which the force balance may be achieved, such control also allowing control over the stroke length and valve opening position or lift. This provides the control methodology by which significant reduction in NVH may be achieved.

Control over the stroke length also allows it to be used as a parameter in metering control where the fuel injection apparatus is used as a delivery injector for directly delivering fuel to the combustion chamber of an engine. Variation of the stroke length or lift of the valve varies the fuel flow area at the valve port and, consequently, the flow of fuel that may pass through the valve port, that is the fuel flow rate. Optionally, a flow restriction—such as a fixed area orifice—may be incorporated within the delivery injector to achieve further control over fuel flow rate.

Such control over fuel flow rate may be integrated with air/fuel ratio control. Where there is a target air/fuel ratio, and the airflow is known, the fuel valve may be opened by the control means to a certain lift corresponding to the required fuel flow rate to achieve target air/fuel ratio. Such control may be adaptive. In an air assisted injection system employing liquid fuel, as described for example, in U.S. Pat. No. 4,934,329, the contents of which are hereby incorporated herein by reference, this would not be required as separate metering is achieved using a dedicated metering unit or metering injector. In the case of operation of an engine with a gaseous fuel, as is particularly preferred, the primary form of control over metering is achieved through control over the opening duration of the delivery injector which may be supplemented by control over stroke length and fuel flow area, in the manner above described, to control fuel flow rate.

The biasing means or spring may be made of magnetic material and used as the armature of the delivery injector thus reducing the number of parts and the moving mass.

On closure of the valve, the solenoid current is advantageously reduced in a controlled manner to reduce the closing velocity of the valve element. This is another aspect addressed to the object of NVH reduction. A plurality of current reduction forms or characteristics are possible. For example, current may be reduced at a variable rate, a single constant rate ramp or plural ramps having plural, though still constant, rates for each ramp. In the closing operation, a physical stop (closure) may be reached. Control over the opening position may also assist in reducing impact on closure since the stroke length between opening position and closure may be reduced over typical injection apparatus, reducing impact force on closure.

The fuel injection apparatus may be used in any kind of engine, whether operating on the two or four stroke cycle, whether using liquid or gaseous fuel and whether manifold or direct injected. The engine may be operated as a spark ignited internal combustion engine at least under some engine operating conditions. However, particular advantages are gained where gaseous fuels are used. Implementation of gaseous fuel injection typically requires larger injectors that may be subject to greater impact forces. Control over the opening and closing processes, and thus impact forces, may therefore be particularly advantageous in reducing NVH issues with this kind of injector. In this aspect, the apparatus is being used in a method for reducing noise vibration and harshness in an engine. Such methodology is not specific to a gas fuelled engine application. However, in this application, ability to provide a useful control parameter, stroke length, for control of fuel metering through a fuel injector, the potential for use of injection, particularly direct injection, for gas fuelled engines is enhanced.

By way of further background, developments and trends in the automotive industry over recent years have highlighted certain potential advantages of having a system which can inject gaseous fuel directly into the combustion chambers of an engine. As well as potentially leading to simpler systems requiring less mechanical components and facilitating improved metering control of the gaseous fuel to the engine as compared with prior art systems, such systems are likely to enable certain cost benefits to be realised by users.

Attempts have also been made to develop gaseous fuel systems where a gaseous fuel, typically hydrogen, is injected into the manifold of a port injected or MPI engine. Port injection systems involve fuel injection into an intake manifold or inlet port of the engine, with port injector(s) delivering fuel from a fuel supply system into each inlet port of the engine. Single or multi-point port injection may be employed. Port fuel injection, because of the relatively large window of timings available for fuel injection, is well adapted to providing the wide range of fuelling required from idle conditions to maximum power conditions (which for high performance engines can be a relatively wide range). However, port fuel injection systems, particularly in 2-stroke cycle engines employing piston controlled exhaust ports, suffer from poor fuel economy due to what is commonly referred to as short-circuiting of the air-fuel charge. These engines also tend to suffer from poor exhaust emissions. Other engines, for example 4-stroke cycle engines, can also suffer from poor fuel consumption and/or increased emissions as a result of the use of port fuel injection systems, for example as described in U.S. Pat. No. 4,934,329. In addition, the use of such Pi systems with gaseous fuels at high speeds and loads may lead to a loss in power due to the air being displaced as a result of the delivery of gaseous fuel into the intake system. In the case of use of hydrogen gas, power loss of the order of 30% would be expected as a result of intake air displacement. For compressed natural gas (CNG), the power loss can amount to about 10%.

To overcome some of these deficiencies, direct fuel injection has been developed and successfully applied to these engines. The Applicant has developed such engines which utilize a dual fluid direct fuel injection system. However, economical provision of a direct fuel injection system that has the required turn-down ratio to control and deliver fuel from idle conditions right through to high power conditions may be a challenge. One way to overcome this challenge involves the use of the present invention to provide the required additional fuelling range by varying the fuel injector valve stroke to meet the fuel meeting requirements for the power and torque targets of the engine.

The above discussion of the background to the invention is intended to facilitate an understanding of the present invention. However, it should be appreciated that the discussion is not an acknowledgement or admission that any of the material referred to was published, known or part of the common general knowledge in Australia as at the priority date of the application.

The method and apparatus of the invention will be more readily understood from the following description of one preferred practical arrangement of the fuel injection apparatus which is illustrated diagrammatically in the accompanying drawings.

In the drawings:

FIG. 1 is a schematic partial cross-sectional view of an internal combustion engine having a direct fuel injection system including a fuel injection apparatus in accordance with one embodiment of the present invention;

FIG. 2b is a detail of the valve of the fuel injector shown in FIG. 2a;

FIG. 4a is a plot of current against time during opening of the fuel injection apparatus as shown in FIGS. 1 and 2;

FIG. 4b is a plot of valve lift or stroke during opening of the fuel injection apparatus as shown in FIGS. 1 and 2;

Figure 2A:
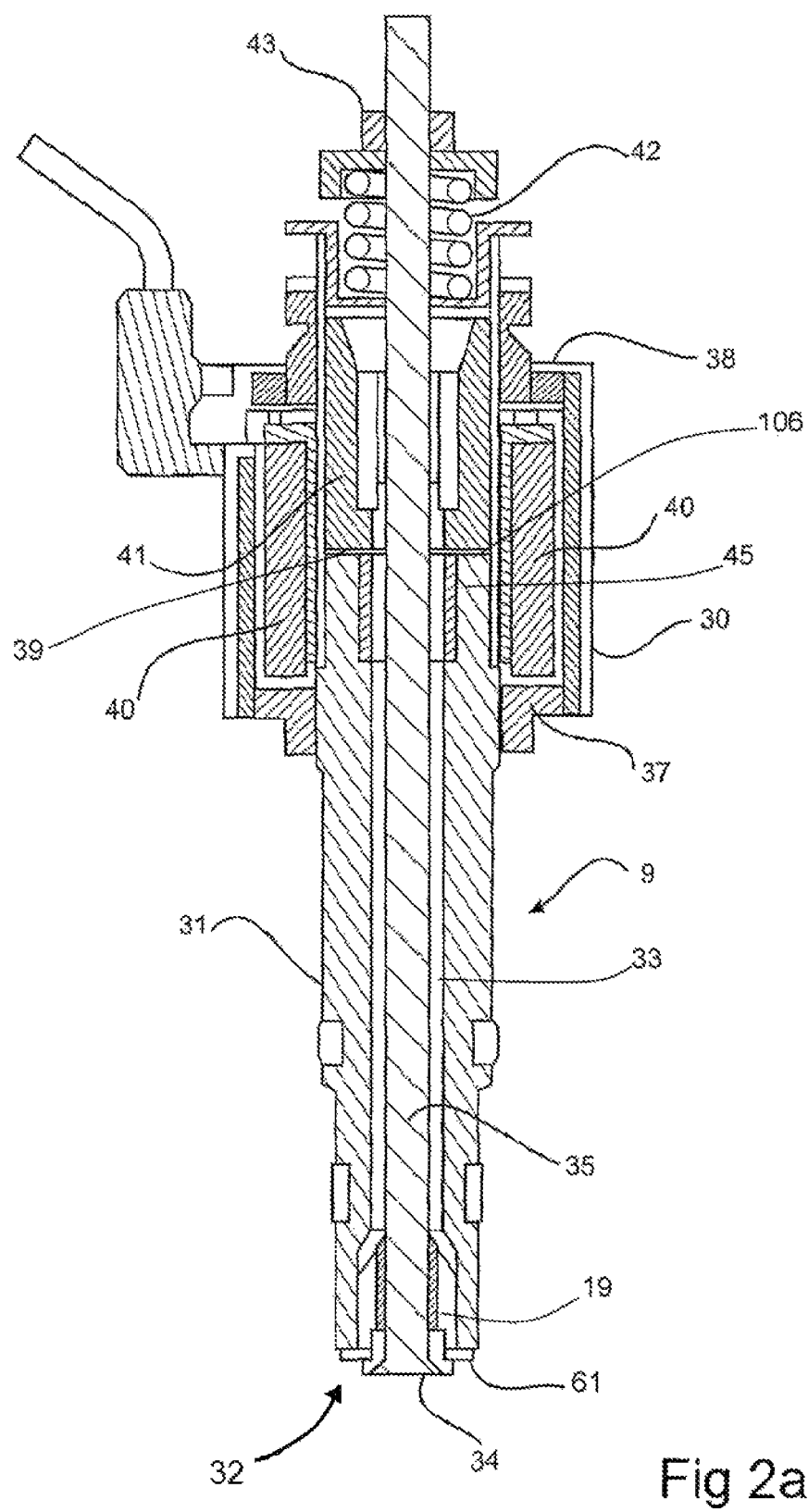
FIG. 2a is a schematic cross-sectional view of a fuel injector used in the direct fuel injection system of FIG. 1.
Figure 2B:
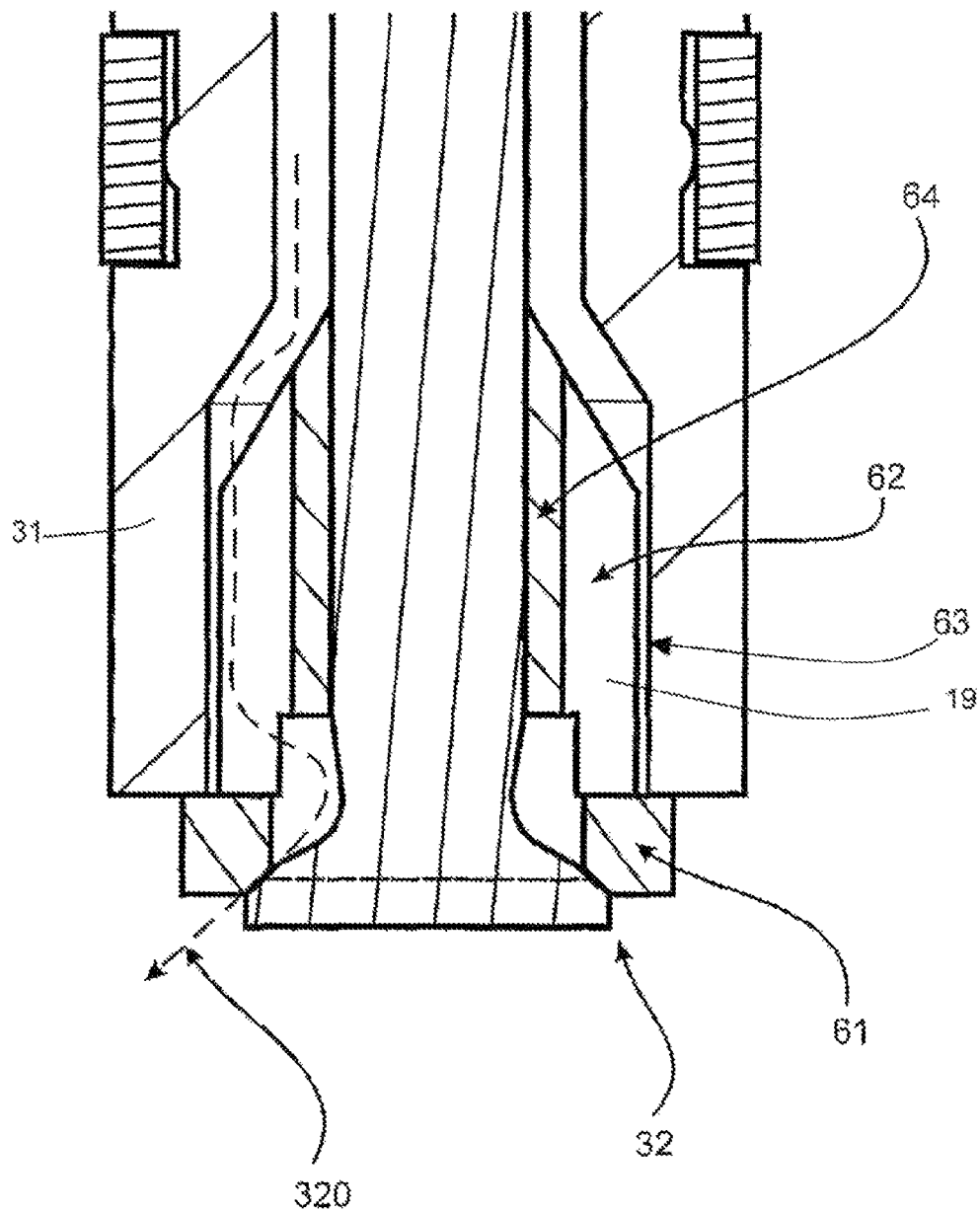
Figure 6:
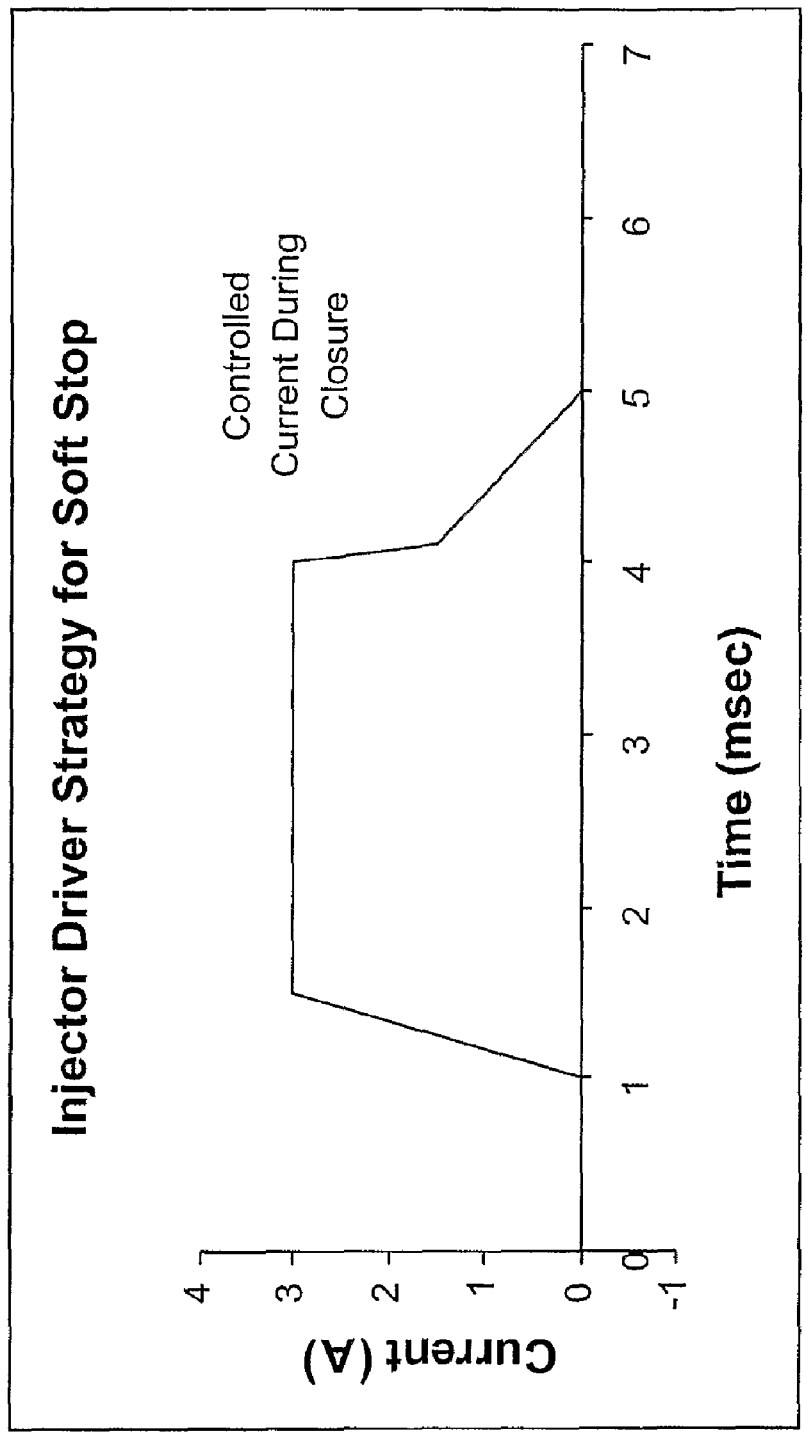
Figure 7A:
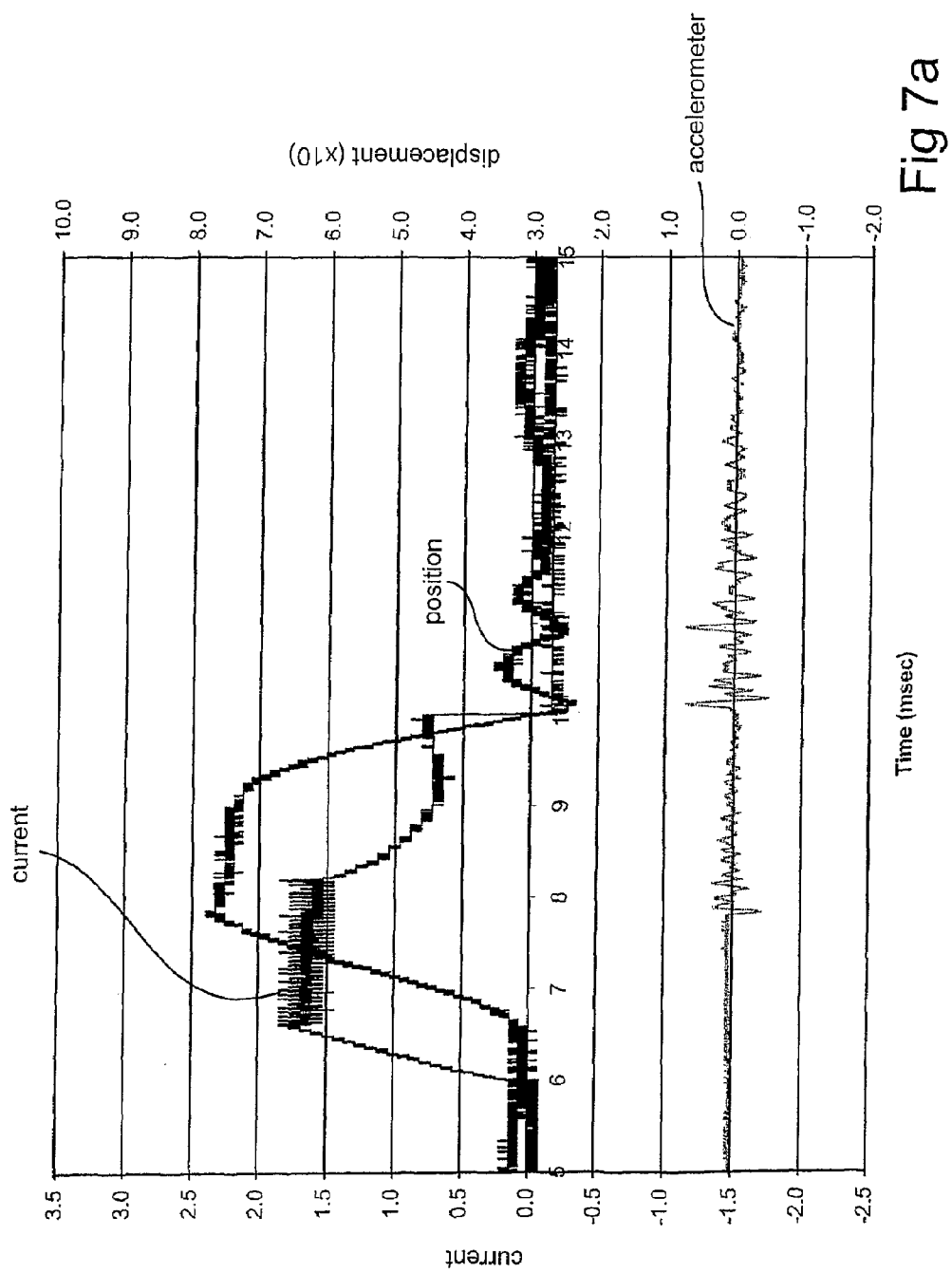
Figure 7B:
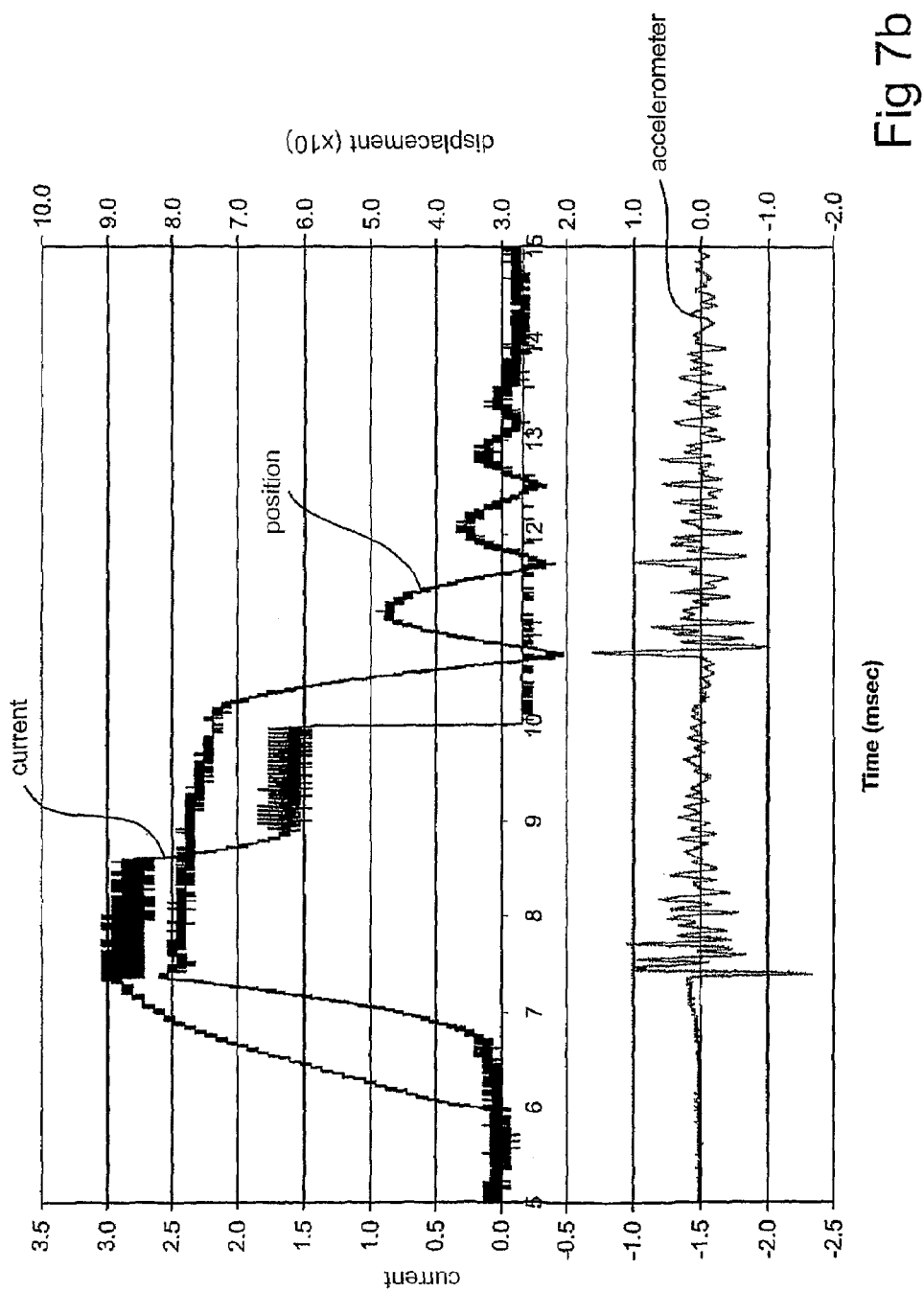
Figure 7C:
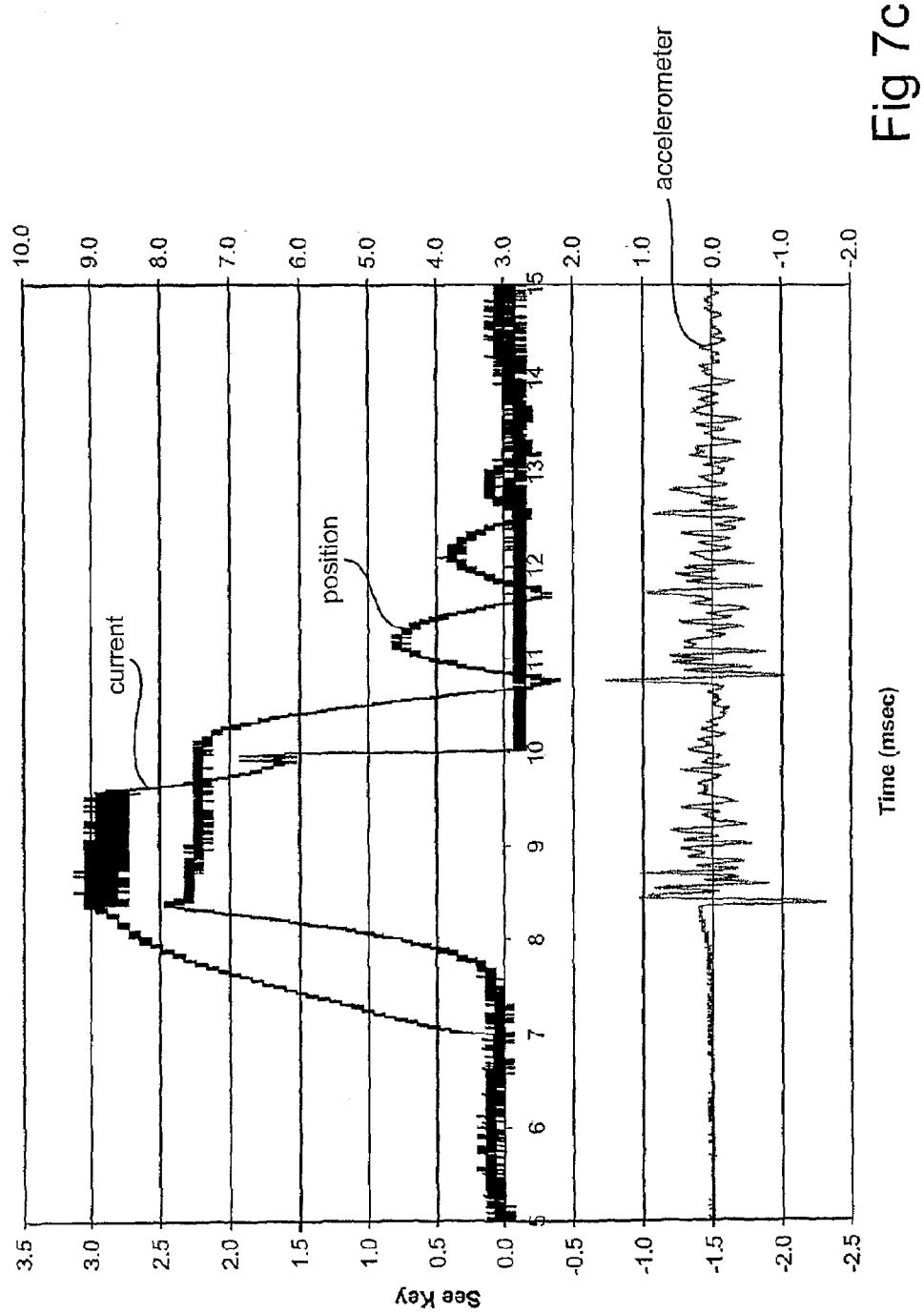
Figure 8:
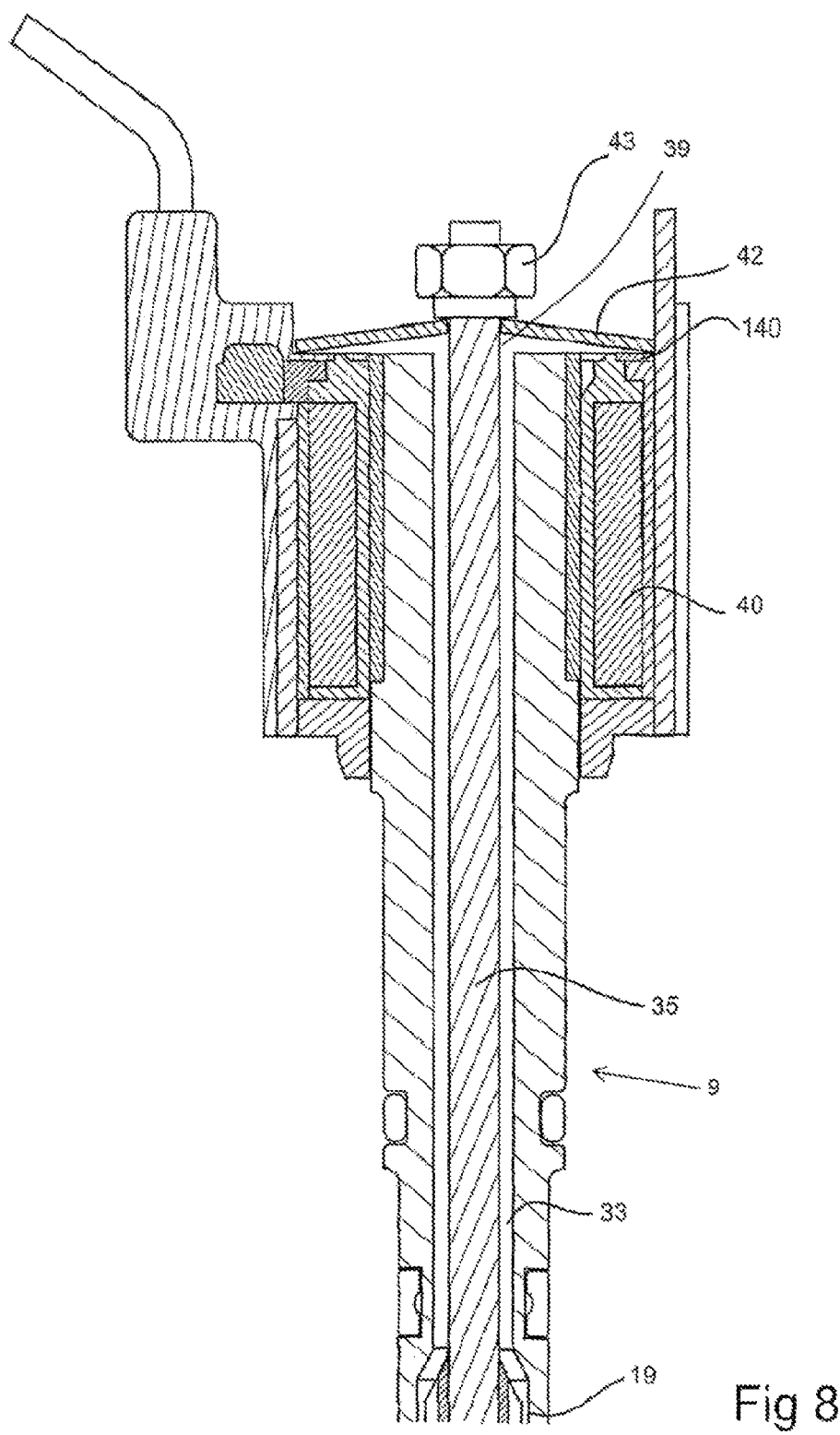

FIG. 6 is a plot of current against time demonstrating current control strategy during closure of the fuel injection apparatus as shown in FIGS. 1 and 2; and FIGS. 7a to c show further plots for current against time illustrating some further current strategies for the fuel injection apparatus as shown in FIGS. 1 and 2; and FIG. 8 is a detail schematic cross-sectional view, of an alternative fuel injector, to that shown in FIG. 2 where a disc spring is the armature.

FIG. 1 shows one cylinder 21 of a direct injected four stroke multi-cylinder internal combustion engine 20 comprising a fuel injection system. The engine 20 is fuelled with gaseous fuel and is operated, at least under some operating conditions, as a spark ignited engine. The cylinder 21 has a combustion chamber 60, a cylinder head 40 and an air intake manifold 22. The fuel injection system supplies gaseous fuel to the combustion chamber 60. The gaseous fuel can, for example, be LPG from a storage source or fuel tank. The fuel injection system includes a fuel supply means which may take the form of a fuel rail unit 11 which may be of conventional type or as described in the Applicant's co-pending International Patent Application Nos. PCT/AU2006/000097 (WO 2006/079172) and PCT/AU2006/000098 (WO 2006/079173) as filed on 27 Jan. 2006), the contents of which are hereby incorporated herein by reference. Accordingly, further description does not follow herein. The fuel injection system delivers gaseous fuel to fuel or delivery injector 9 which is of solenoid actuated type. No fuel pump need be used.

Referring now to FIG. 2 for greater detail, delivery injector 9 has a housing 30 with a cylindrical spigot 31 projecting from a lower end thereof with an injection valve with its port 32 communicating, through a fuel passage having a lower portion 19 of greater annular flow area than portion 33, with the fuel rail unit 11 for supply of fuel. The poppet valve element or head 34, which co-operates with valve port 32, is secured to a valve stem 35. Fuel injector 9 is solenoid actuated.

The valve seat is formed by a valve seat element 61 attached to the end of the spigot 31 by suitable means, such as welding. A slotted bearing 62 is press fillted into the inner bore 63 of the spigot 31. The slots through the bearing allow for the increased flow area 19 in the vicinity of the valve port 32. The slotted bearing comprises an annual sleeve 64 which provides a bearing surface for the injector leg 35 and provides guidance to ensure correct seating of the valve 34 onto the valve seat 61.

The solenoid coil 40 is located in the housing 30 concentric with the valve stem 35 and is retained between the base 37 of the housing 30 and the cover plate 38. A solenoid armature 41 is affixed to the upper end of the valve stem 35. Armature 41 has limited maximum axial movement as indicated by the gap 39 and is urged in an upward direction by the spring 42 to normally maintain the valve head 34 in a closing relation with the valve port 32. The spring 42 is a coil spring (a disc spring is shown as an alternative in FIG. 8) of variable characteristic or rate as determined to be suitable for the particular fuel injection system application by trial and error or design algorithm relating spring rate to the particular fuel injection system application. When in the form of a disc spring, spring 42 may be used for radial location of the upper end of the valve stem 35.

The spring 42, in its normal state, is stressed to apply an upward directed force to the valve stem 35 to hold valve head 34 in a closed position. Calibration nut 43 may be adjusted to adjust the pre-stress or pre-load on spring 42.

Coil 40 is located around the core 45 and wound to produce a magnetic field when energized to draw the armature 41 downward. The downward movement of the armature 41 will effect a corresponding movement of the valve stem 35 to open the injection valve port 32. Upon de-energising of the coil 40, the spring 42 will raise the valve stem 35 to close the injection valve port 32. In conventional solenoid actuated fuel injectors, the degree of downward movement of the armature 41 would be limited by the armature 41 engaging the upper shoulder 106 of the core 45. This is the cause of the "hard landing" problem.

The operation of the fuel injection apparatus is under the control of an electronic control means or control unit (ECU) 170. The ECU 170 may be programmed with suitable processes to regulate the energizing of the solenoid in accordance with the various known programs of sensing a range of engine operating conditions and processing these to produce electric signals appropriate to operate the solenoid or like device for regulation of the amount of fuel delivered to the engine 20.

The ECU 170 is responsive to the fuel demand of the engine 20, and will thus remain energized for a time interval that will permit the required amount of gaseous fuel to be delivered from the fuel injection valve port 32 to meet the engine demand at that particular period and having reference to engine 20 operating conditions. The regulation of the fuel supply may also be achieved by either varying the time for which the solenoid is energized, or by energizing the solenoid for a fixed period each time but varying the number of periods that the solenoid is energized for each cycle of the engine 20.

The ECU 170 also operates the solenoid in order to reduce/avoid impact or vary stroke length of the armature. The ECU 170 is programmed with spring characteristic or rate for disc spring 42. The ECU 170 also controls the current supply to the coil 40, and through this, the magnetic "opening" force applied to the armature 41, this induced magnetic force being directly related to the current. ECU 170 also senses other data such as engine speed, engine demand, pressure in cylinder 21 and/or crankshaft position such that forces, other than spring forces, urging closure of the delivery injector 9 may be calculated. The parameters may be selected with reference to the sophistication of the proposed ECU 170. Some advantage may still be achieved even if some lesser forces are discounted or simply estimated.

Figure 3A:
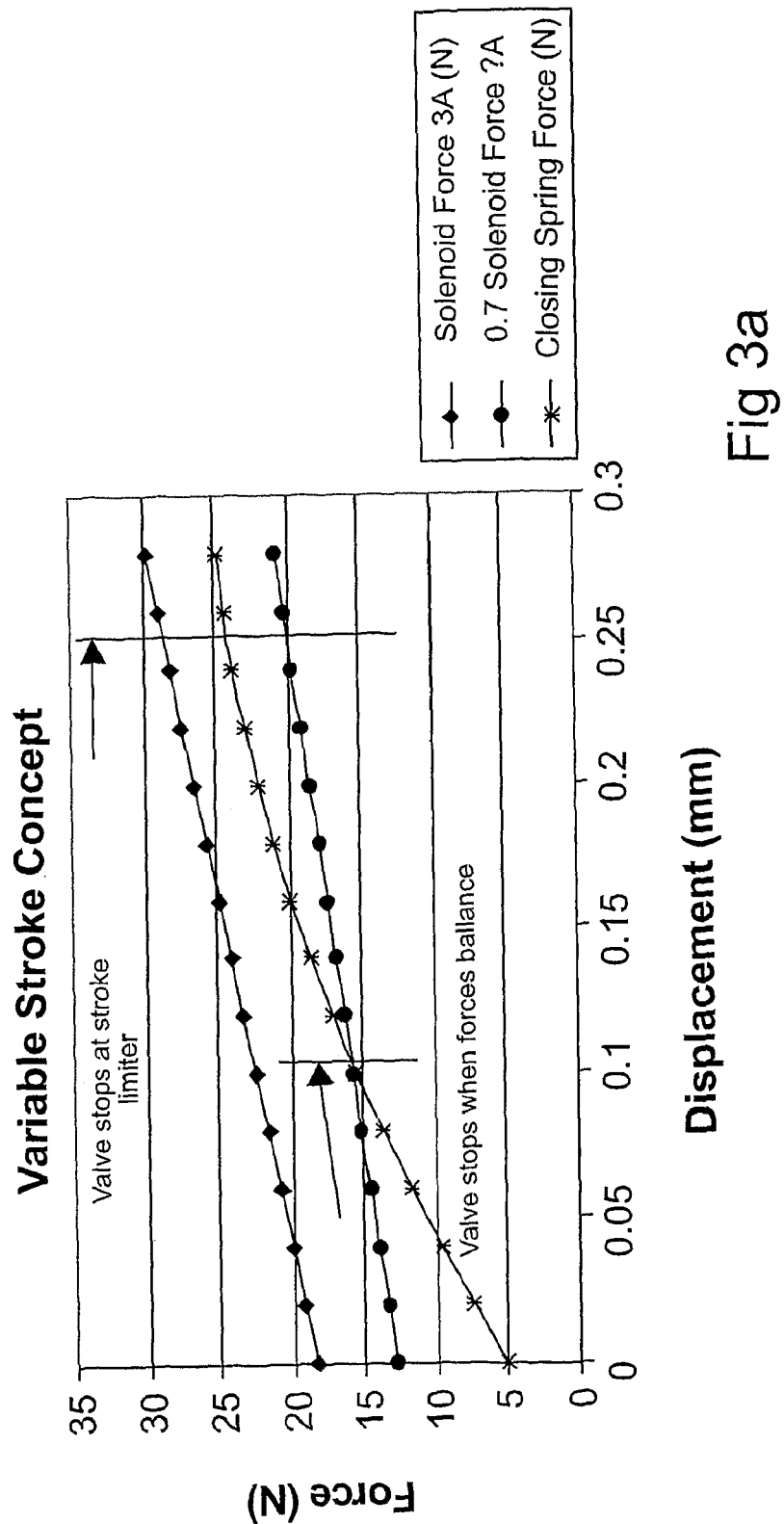
FIGS. 3a and 3b are plots of opening and closing forces against armature displacement for the fuel injection apparatus as shown in FIGS. 1 and 2.

Delivery injector 9 is opened by energizing solenoid coil 40. This energizing, with a known current, creates a determinable magnetic or solenoid force, B. The ECU 170 is programmed with the spring rate, so that the closing force, S, exerted by the spring 42 at any point along the stroke of armature 41 is known. FIG. 3a shows the solenoid force increasing, on energizing of coil 40, and in excess of the closing force exerted by spring 42. The delivery injector 9 is opening. However, the closing force exerted by spring 42 is also increasing, at a more rapid rate, than the rate of increase in solenoid force at 0.7 A current in coil 40, this being an effect of using a spring 42 with variable spring rate.

The forces balance at a displacement, calibrated for the fuel injection apparatus, of 0.15 mm corresponding with a valve opening at which fuel may be delivered through port 32 in the desired manner. No collision of armature 41 with shoulder 106 of core 45 occurs and so noise inducing impact is avoided. NVH is correspondingly reduced.

FIG. 3a also shows how current control, at 3A, produces a solenoid force always greater than the closing spring force in which case the armature 41 would impact at a physical stop in a non-advantageous manner. The plots of FIGS. 3a and 3b—are illustrative since only solenoid and spring forces are demonstrated. Yet it will readily be appreciated, from the plots, that spring forces and solenoid forces may be controlled by appropriate selection of spring characteristic and current control (as illustrated) such that the forces balance and the valve opens without hard landing occurring.

Figure 3B:
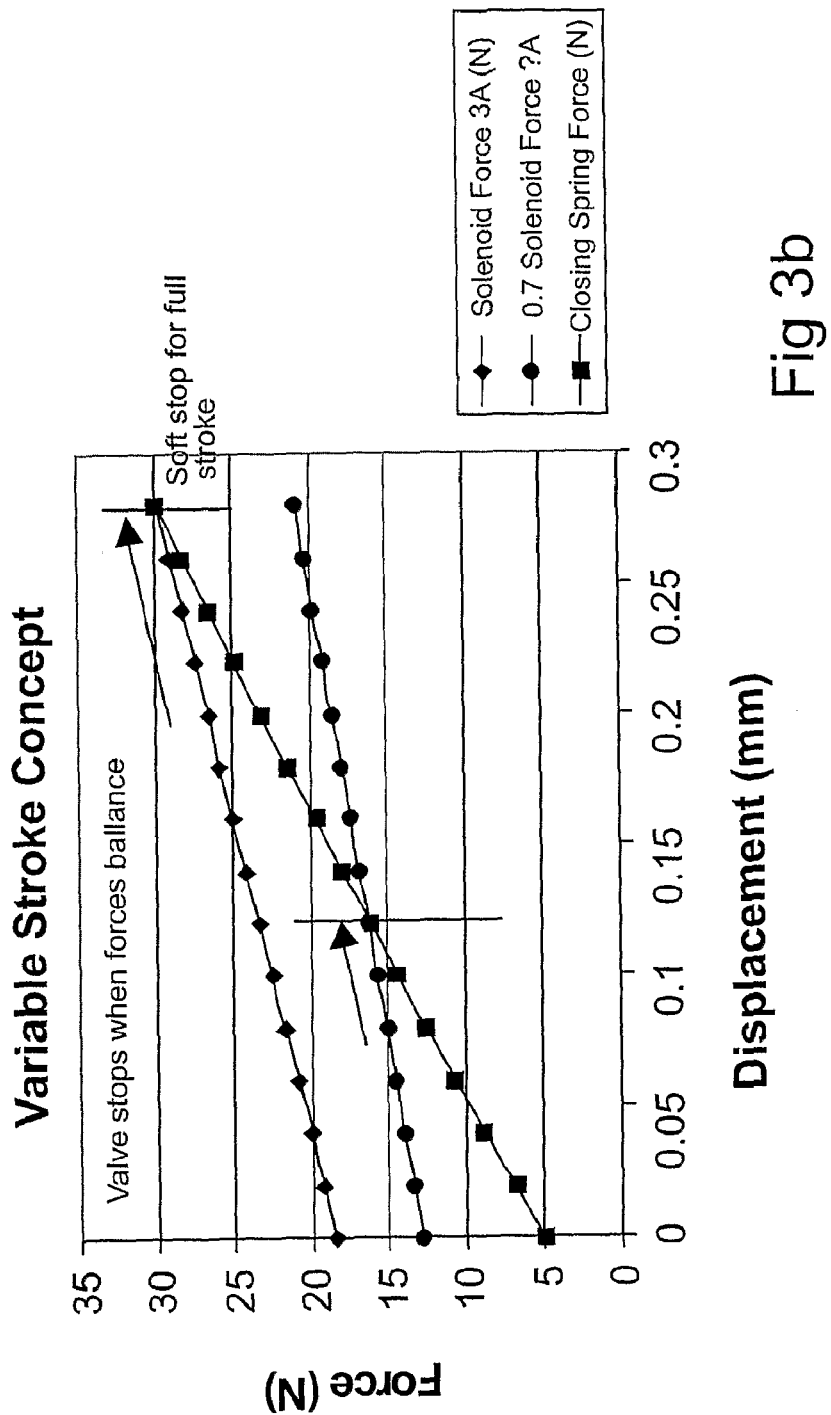

FIG. 3b, for example, shows how, through appropriate current control, a soft stop may be reached by a balance of spring and solenoid forces at the full stroke with negligible or no impact.

The forces acting on a fuel injection apparatus in engine 20 are dynamic, varying rapidly in short time intervals in accordance with variation in engine 20 operating conditions. The other significant and variable force urging closure of the delivery injector 9 is that exerted by cylinder gas pressure (C) which may also be calculated by ECU 170 for a given point in the engine cycle under known engine 20 operating conditions. ECU 170 may take account of such engine 20 operating conditions when calculating closing forces exerted by the cylinder gas pressure and controlling the current required to create a force B necessary to balance with the total of the forces C and S. Current will then be controlled accordingly, for example by holding current at a more or less constant value, such that the opening position of armature 41 is reached, by force balance, without impact with a physical stop. FIGS. 4a, 6 and 7 show possible current forms during the opening process and duration; each being characterised by a rapid ramp up in current to the target holding current at which current dwells for the requisite opening duration.

The above principles may also be employed to achieve control over the fuel flow rate. The fuel injection apparatus may be calibrated such that the displacement of the armature 41 corresponds to a known fuel flow rate through the valve port 32. That is, opening or lifting the valve element 34 to a certain position corresponds with a known fuel flow area and, consequently—through the relationship between fuel flow rate and fuel flow area, fuel flow rate. The ECU 170 may therefore control the lift or stroke length of the valve element 34 to vary the fuel flow area at the port 32 and, consequently, the flow of fuel that may pass through the valve port 32, that is, the fuel flow rate. In this way, a quantity of fuel may be metered through valve port 32 of the delivery injector 9 using stroke length as a control parameter. Dashed line 320 illustrates the path that fuel metered through the valve port 32 follows. Again, the spring force (S) is known and the force (C) imposed by cylinder 21 gas pressure is also known for given engine 20 operating conditions. ECU 170 then controls current delivered to coil 40 to achieve a solenoid force (B) allowing a force balance at the opening of the valve element 34 to a position or lift corresponding to the desired fuel flow rate to be delivered to combustion chamber 60. ECU 170 then controls the opening duration or pulse width of the delivery injector 9 to allow the required quantity of fuel to be delivered to the combustion chamber 60. FIG. 4b shows how valve lift varies with current supplied to coil 40. At lower current, there is a lower solenoid force, and accordingly a lower lift. A comparison of the current and corresponding lift plots of FIG. 4b demonstrates this.

Figure 5:
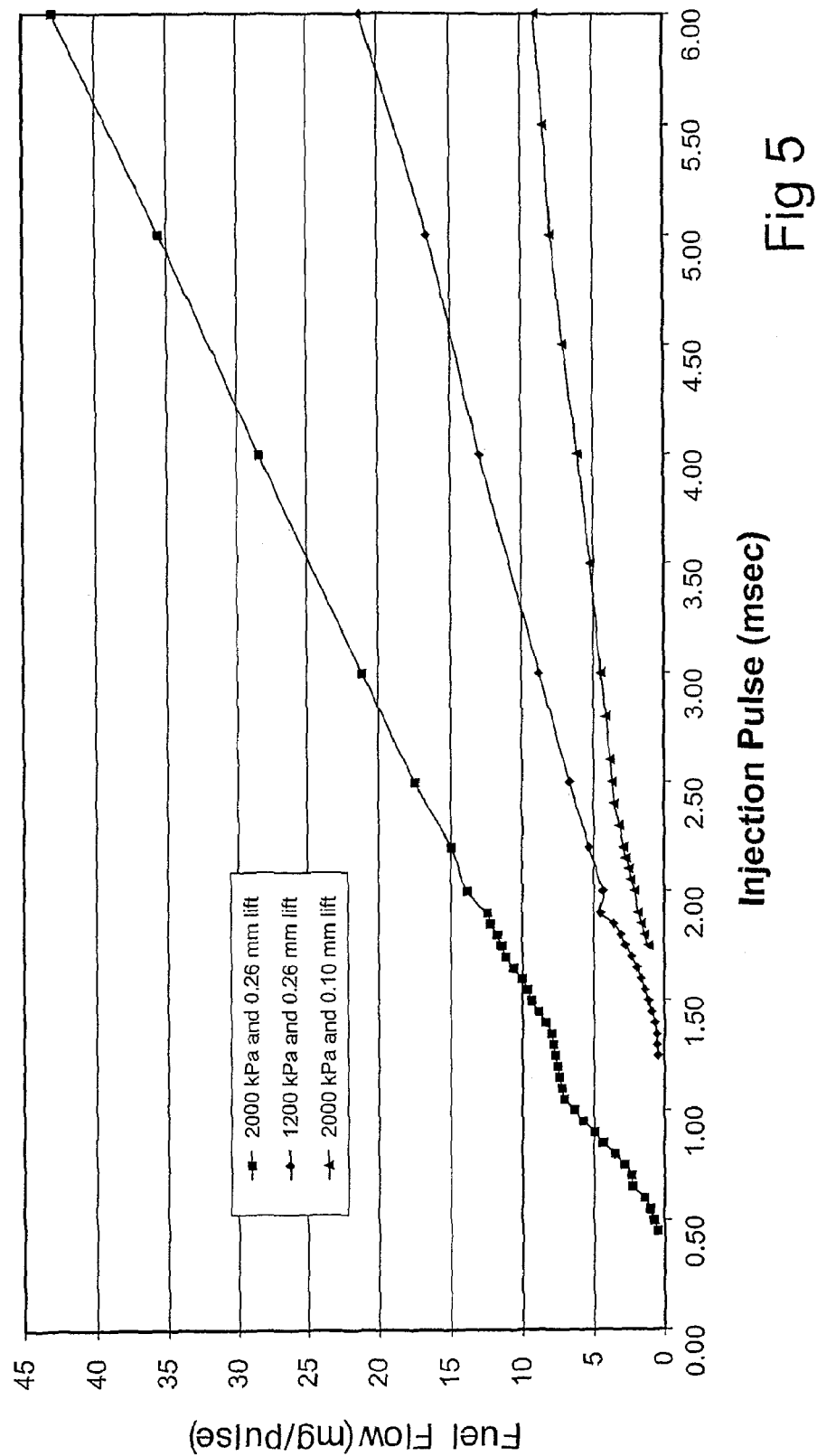
FIG. 5 is a plot of fuel flow rate against opening duration of the fuel injection apparatus as shown in FIGS. 1 and 2 for varying fuel pressure and valve lift or stroke.

FIG. 5 shows how fuel flow rates vary with pulse width for delivery injector 9 at varying fuel pressures. It will be observed that fuel flow rate deliverable at a given fuel pressure increases with increasing valve lift. It will also be observed that the plots become linear above a certain minimum pulse width. It is therefore advantageous to the control strategy to have a pulse width greater than about 2 ms.

The control over fuel flow rate allows the fuel injection apparatus to be controlled, for example, in accordance with an air led strategy. ECU 170 is provided with air flow data and look-up maps provide desired or target air/fuel ratios for various engine operating conditions. When air flow is known, the fuelling may be set to achieve the target air/fuel ratio. ECU 170 may control the fuelling rate, in the manner above described, and the opening duration of the delivery injector 9 to achieve the target air/fuel ratio. Where a lambda sensor is used, ECU 170 may adapt the current control strategy and solenoid force to achieve the valve lift necessary to allow appropriate control over air/fuel ratio.

ECU 170 schedules injection events to allow the appropriate quantity of fuel to be delivered for given engine 20 operating conditions and required combustion stability and drivability.

On closing of fuel injector 9, the current is reduced, under control of ECU 170, to reduce the magnetic force urging movement of armature 41 towards its open position. As the spring force is known at each point along the stroke of the armature 41, ECU 170 may control the current to create a magnetic force B acting against the spring force and a product closing force enabling closure of the valve at a controlled velocity of movement of armature 41. This enables the armature 41 to come to a "soft stop" on valve closing. ECU 170 may control current in a variety of ways to achieve this soft stop. FIGS. 6 and 7 show possible current control strategies, built around ramping current down at a controlled rate:to reduce armature 41 velocity on closing. It will be noted, from FIG. 7, that valve bounce is reduced where current is ramped down rather than suddenly switched off. Even if current is not ramped all the way to zero current but switched off after an initial ramp down, less valve bounce occurs. Current could, theoretically, be reduced at a relatively slow rate, possibly allowing valve bounce to be avoided.

Modifications and variations to the fuel injection apparatus and method of the present invention will be apparent to the skilled reader of this disclosure. Such modifications and variations are deemed within the scope of the present invention. For example, FIG. 8 shows a fuel injector in which the disc spring 42 acts as the armature reducing the number of parts and the moving mass. Active gap 39 is shown also, the periphery of disc spring 42 rests on a non-magnetic part or isolator 140. Fuels, other than gaseous fuels, may also be readily employed in fuel injectors within the scope of the present invention.

The invention claimed is:

1. A fuel injection apparatus comprising:
   a solenoid coil;
   an armature coupled with a valve element operable to move the valve element towards an opened position when the solenoid coil is selectively energized with a current and to allow the valve element to move towards a closed position when the solenoid coil is de-energised, the valve element being biased towards the closed position by a biasing means; and
   a control means configured to calculate a force difference between a force urging opening of the valve element and a force urging closure of the valve element, the control means configured to energize the solenoid coil with the current to cause a magnetic force to move the valve element to the opened position to allow delivery of fuel, the control means configured to control the current such that the force difference is at a pre-determined value when the valve element is in the opened position.

2. The fuel injection apparatus of claim 1 wherein the control means is configured to control the current such that the opened position of the valve element is reached when the force urging opening of the valve element is substantially equal to the force urging closure of the valve element.

3. The fuel injection apparatus of claim 1 wherein the opened position of the valve element is reached with no portion of the armature and no portion of the valve element impacting with a physical stop.

4. The fuel injection apparatus of claim 1 wherein:
   the valve element forms part of a fuel injector; and
   the control means is configured to control the current such that a stroke of the valve element is varied to control a quantity of fuel metered through the fuel injector.

5. The fuel injection apparatus of claim 4 wherein the fuel is a gaseous fuel.

6. The fuel injection apparatus of claim 4 wherein the fuel injector is a direct fuel injector and the fuel is metered through the direct fuel injector to a combustion chamber of an engine.

7. The fuel injection apparatus of claim 4 wherein the engine operates, at least under some engine operating conditions, as a spark ignited internal combustion engine.

8. The fuel injection apparatus of claim 1 wherein the valve element forms part of a fuel injector and the opened position of the valve element is varied in accordance with the fuel flow requirements of the fuel injector.

9. The fuel injection apparatus of claim 1 wherein the force urging opening of the valve element predominantly acts on an internal surface of the valve element.

10. The fuel injection apparatus of claim 1 wherein the force urging closure of the valve element predominantly acts on an external surface of the valve element.

11. The fuel injection apparatus of claim 1 wherein the biasing means is a spring having a constant spring rate or a constant stiffness characteristic.

12. The fuel injection apparatus of claim 1 wherein:
   the biasing means is a spring having one of a variable spring rate and a variable stiffness characteristic so that the force urging closure of the valve element increases as the valve element opens: and
   the control means is configured to calculate the force difference based at least in part on the increase of the force urging closure of the valve element.

13. The fuel injection apparatus of claim 1 wherein the biasing means is a spring having a spring rate or a stiffness characteristic greater than the magnetic force generated by the solenoid coil when the solenoid coil is energized.

14. The fuel injection apparatus of claim 1 wherein the armature has a limited axial stroke.

15. The fuel injection apparatus of claim 14 wherein the control means is configured to control the axial stroke by controlling the current such that the magnetic force generated by the solenoid coil is balanced with at least one of the force urging opening of the valve element and the force urging closure of the valve element at a controlled armature displacement.

16. The fuel injection apparatus of claim 15 wherein control over the balance of forces controls the valve opened position or lift.

17. The fuel injection apparatus of claim 1 further comprising:
   a solenoid actuated fuel delivery injector with a flow restriction for providing trimming control over a fuel flow rate.

18. The fuel injection apparatus of claim 1 wherein the biasing means is made of a magnetic material.

19. The fuel injection apparatus of claim 18 wherein the biasing means acts as the armature.

20. An engine comprising the fuel injection apparatus of claim 1.

21. The fuel injection apparatus of claim 1, wherein the control means is configured to calculate the force difference based at least in part on any one of a cylinder pressure or a crankshaft position.

22. The fuel injection apparatus of claim 1, wherein the control means is configured to calculate the force difference based at least in part on an axial position of the armature during an opening event.

23. The fuel injection apparatus of claim 1, wherein the control means is configured to control the current such that the armature is spaced apart from a physical stop when the valve element is in the opened position.

24. A method of operating a fuel injection apparatus including a solenoid coil; an armature coupled with a valve element operable to open and close the valve element when the solenoid coil is selectively energized and de-energised with a current, the valve element being biased in a closed position by a biasing means; and a control means, the method comprising:
   calculating, via the control means, an opening position based on a difference between a force urging opening of the valve element and a force urging closure of the valve element being at a predetermined value; and
   energizing the solenoid coil, by the control means, to cause a magnetic force to move the valve element to the opening position.

25. The method of claim 24 wherein the opening position is reached when the control means calculates that the force urging opening of the valve element balances with the force urging closure of the valve element.

26. The method of claim 24 wherein the opening position is reached with no portion of the armature and no portion of the valve element impacting a physical stop.

27. The method of claim 24 wherein the calculating includes calculating the opening position of the valve element in accordance with fuel flow requirements of the fuel injection apparatus.

28. The method of claim 24 wherein the energizing includes controlling the magnetic force generated by the solenoid coil such that the force urging opening of the valve element and the force urging closing of the valve element are balanced to control at least one of a stroke length of the valve element and the valve opening position.

29. The method of claim 28 further comprising:
controlling a quantity of a fuel metered through the fuel injector apparatus by controlling the stroke of the valve element.

30. The method of claim 29 wherein the valve element forms part of a direct fuel injector, fuel being metered through the direct fuel injector to a combustion chamber of an engine when the valve element is in the opening position.

31. The method of claim 24 wherein the energizing includes controllably reducing a solenoid current to reduce velocity of the valve element on closing.

32. The method of claim 31 wherein the solenoid current is controllably reduced at a variable rate.

33. The method of claim 31 wherein the solenoid current is controllably reduced via at least one of a single constant rate ramp or a plurality of constant rate ramps.

34. The method of claim 24 further comprising:
controlling a current to the solenoid such that the valve element is closed against a physical stop at a controlled velocity.

35. The method of claim 24 wherein the calculating includes calculating the opening position of the valve element in accordance with fuel flow requirements of the fuel injection apparatus, the method further comprising:
controlling an air-fuel ratio of an engine cooperatively with the energizing.

36. The method of claim 35 wherein the controlling of the air-fuel ratio includes:
setting a target air-fuel ratio,
determining an air flow to the engine and
controlling fuel delivery to the engine by controlling the opening position of the valve element.

37. The method of claim 29 wherein said fuel is a gaseous fuel.

38. The method of claim 24 wherein the energizing includes controlling the magnetic force such that the armature is spaced apart from a physical stop when the opening position is reached.

* * * * *